Figure 11:
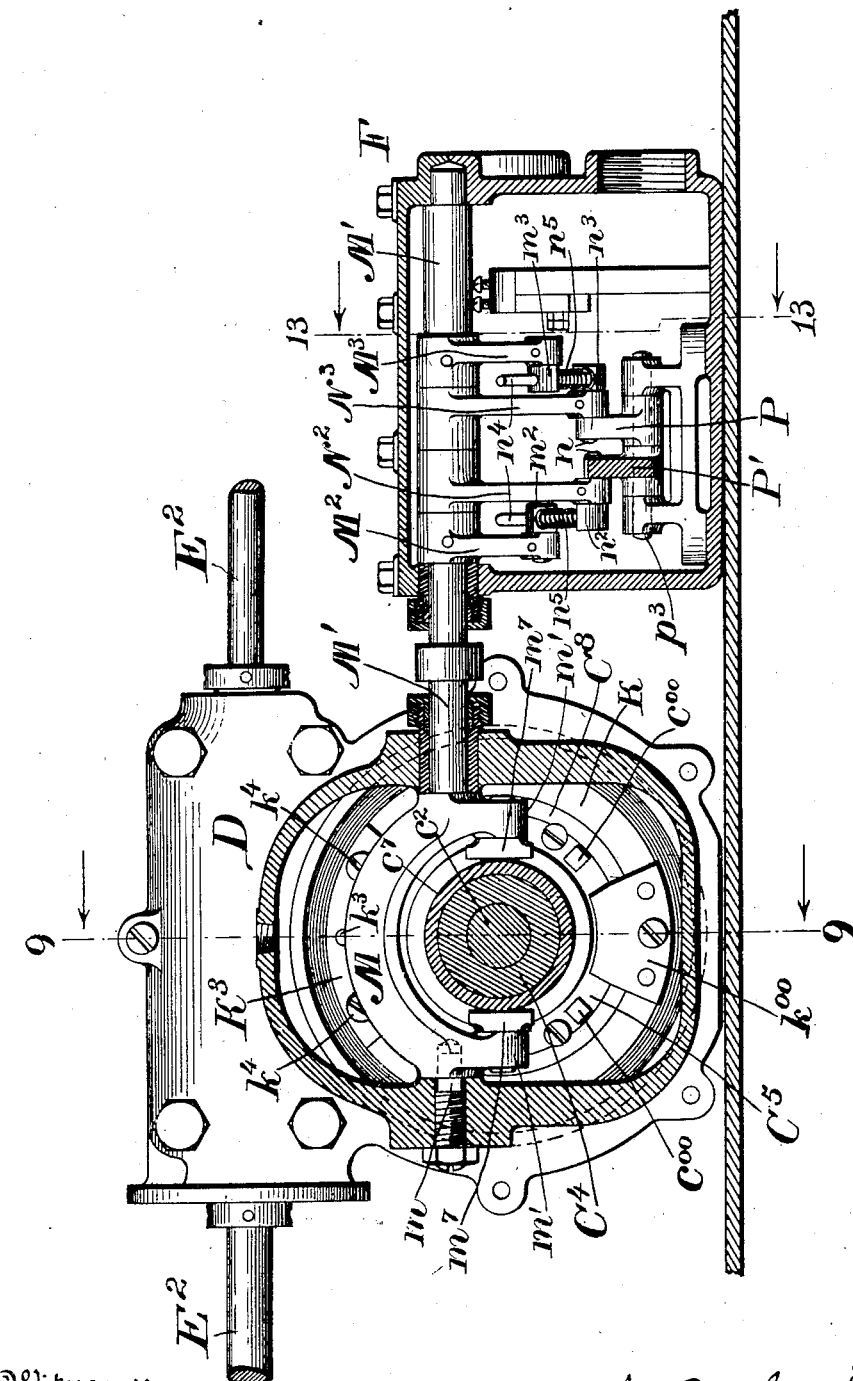

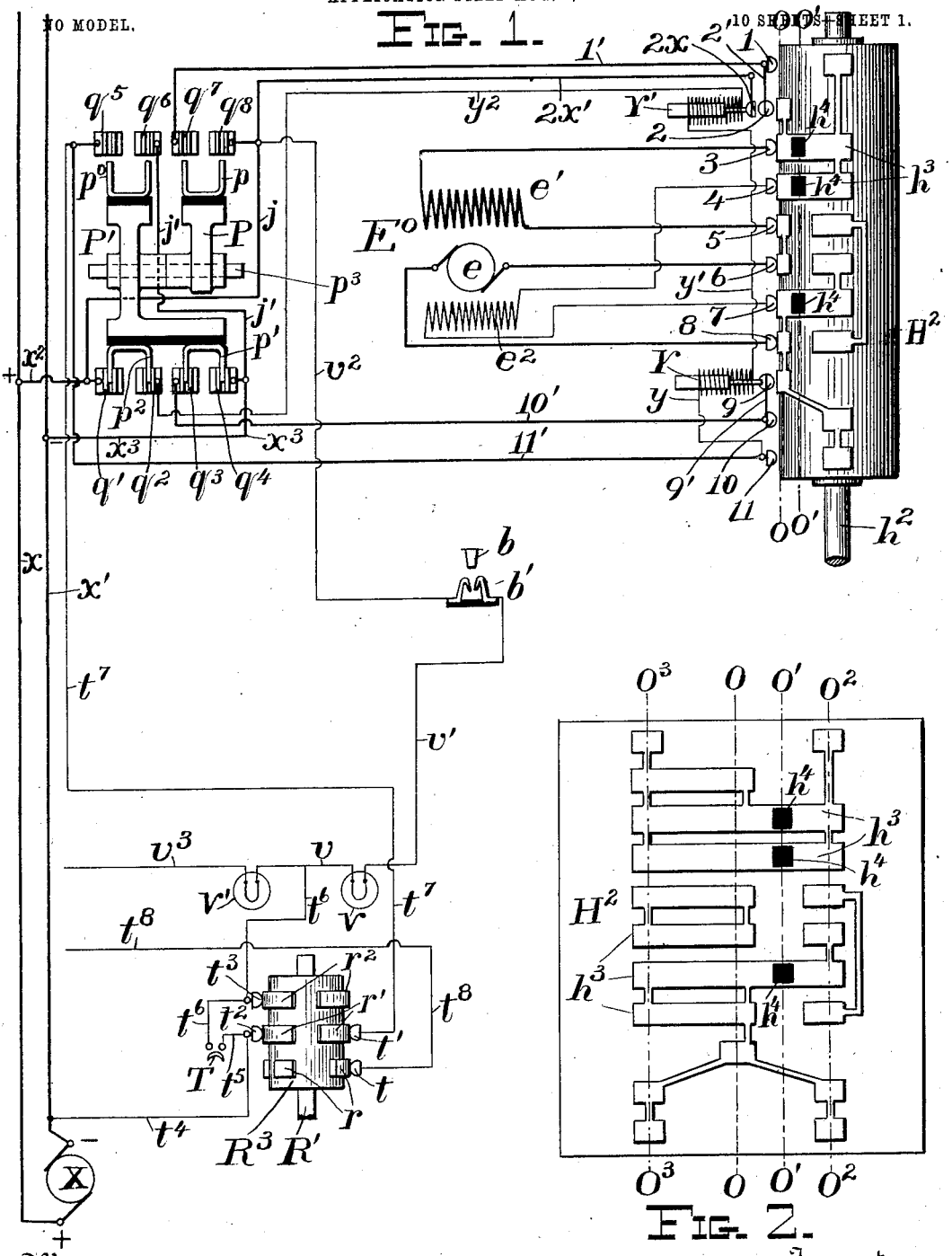

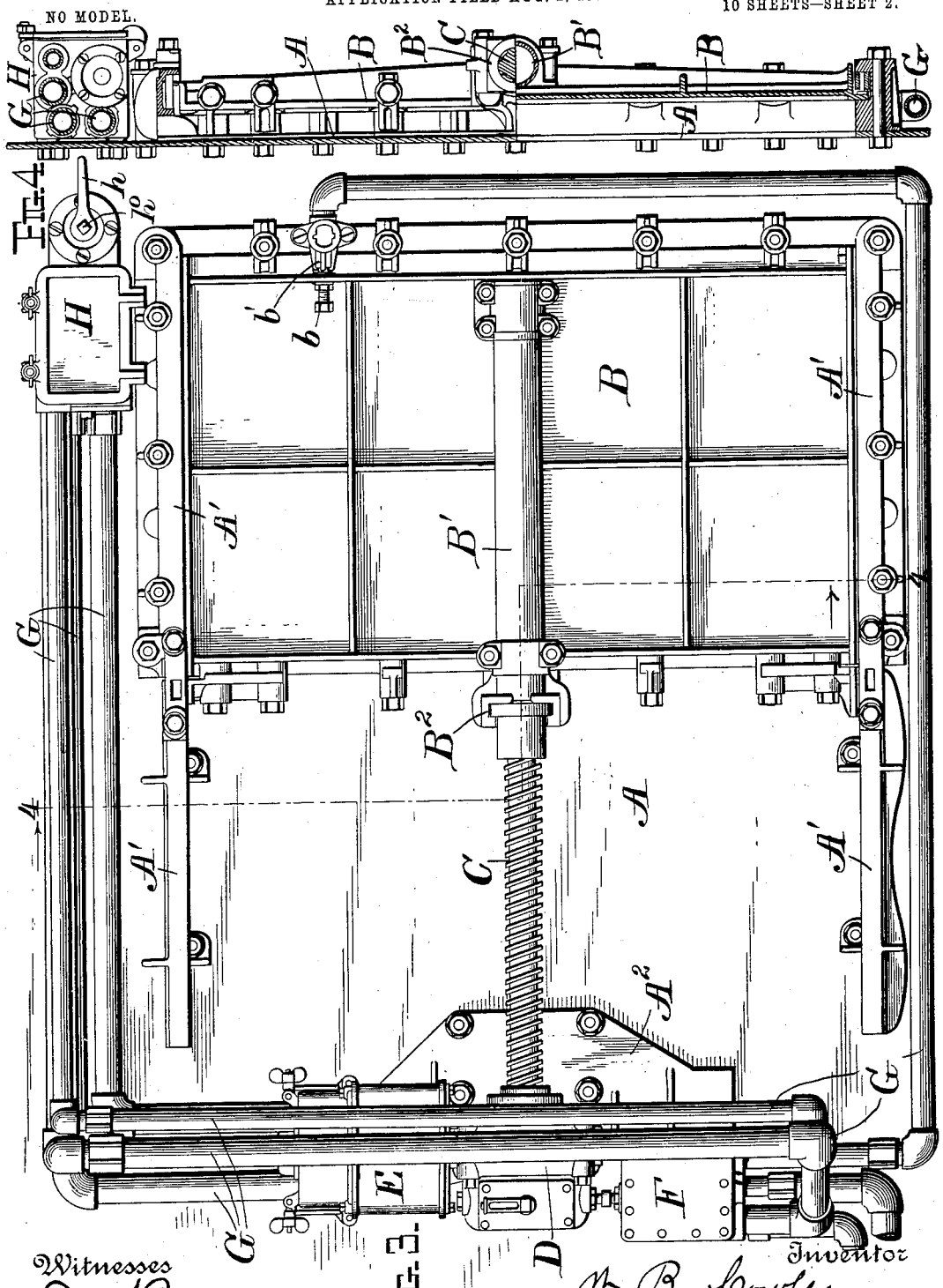

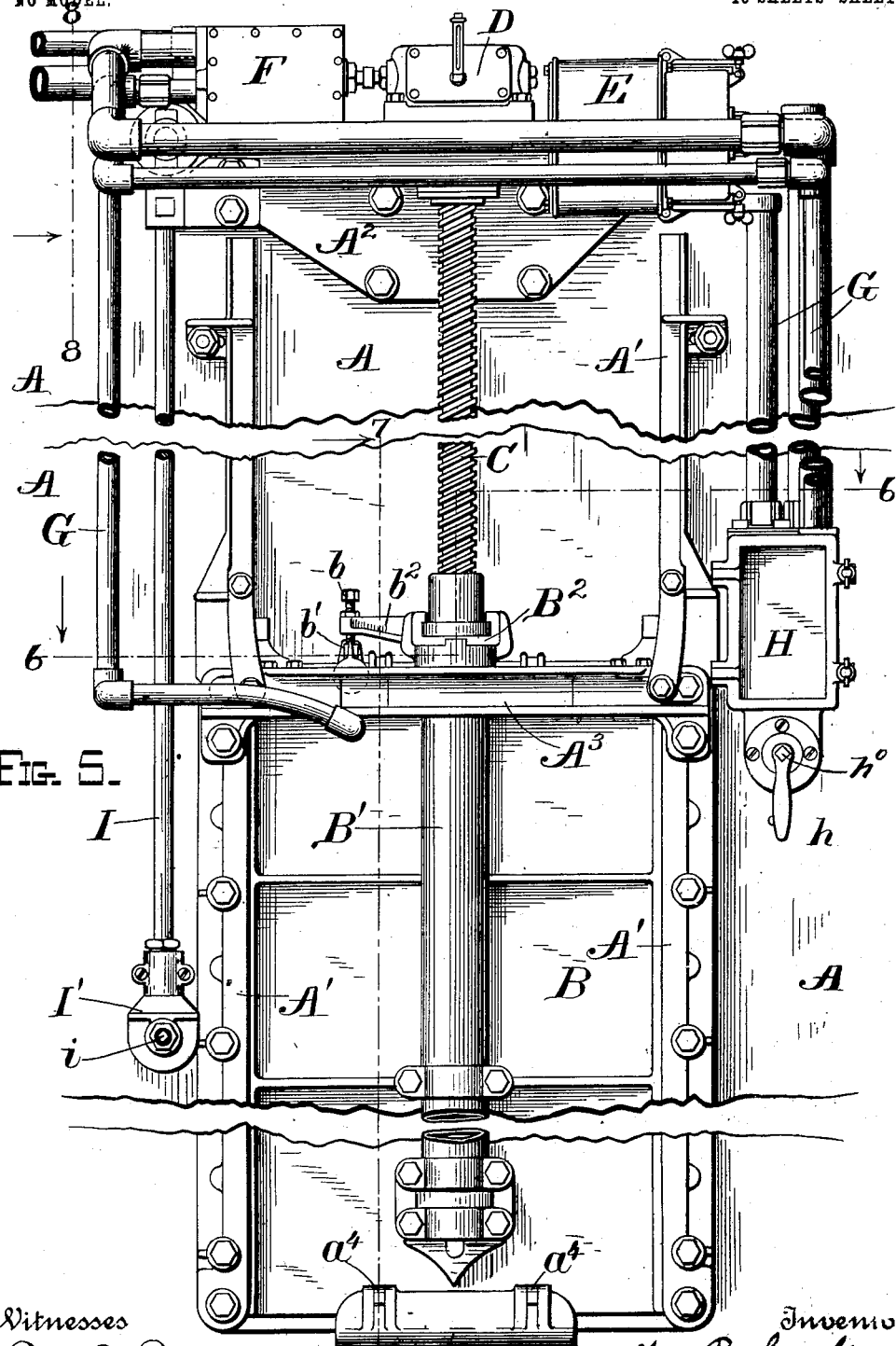

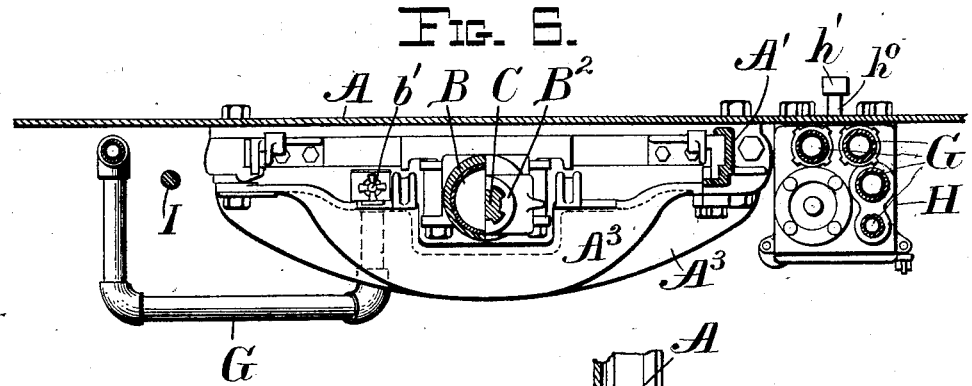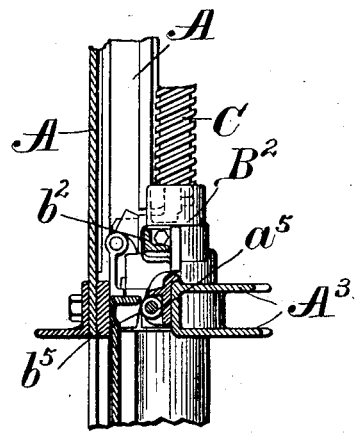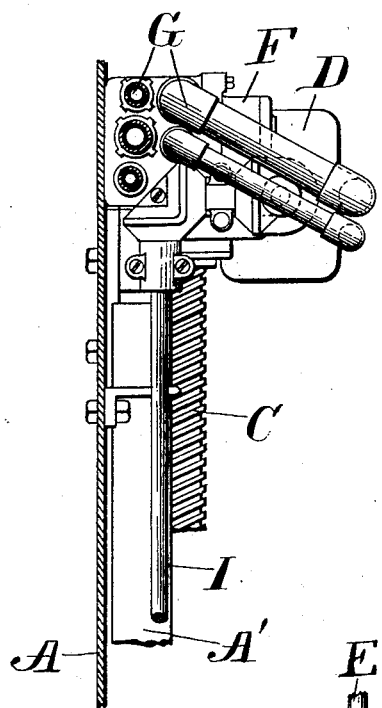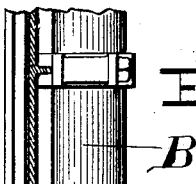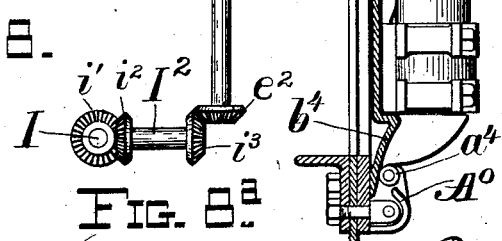

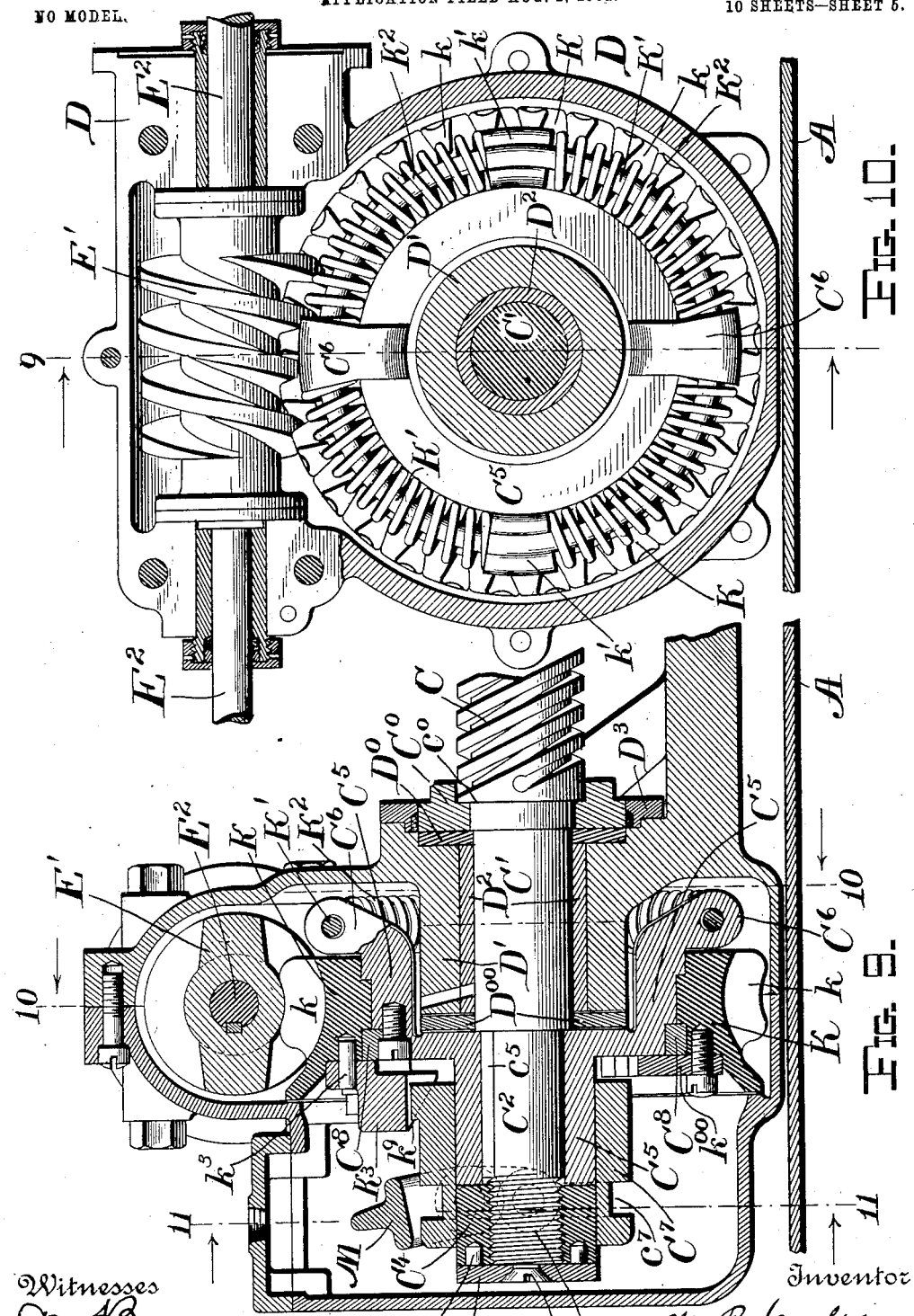

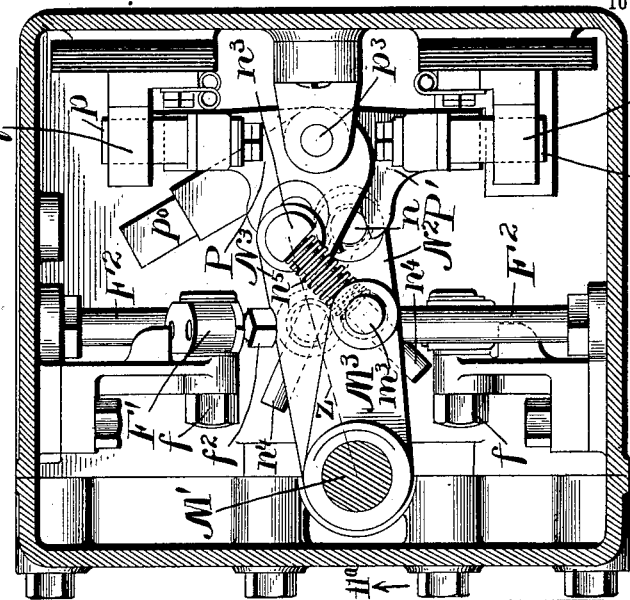
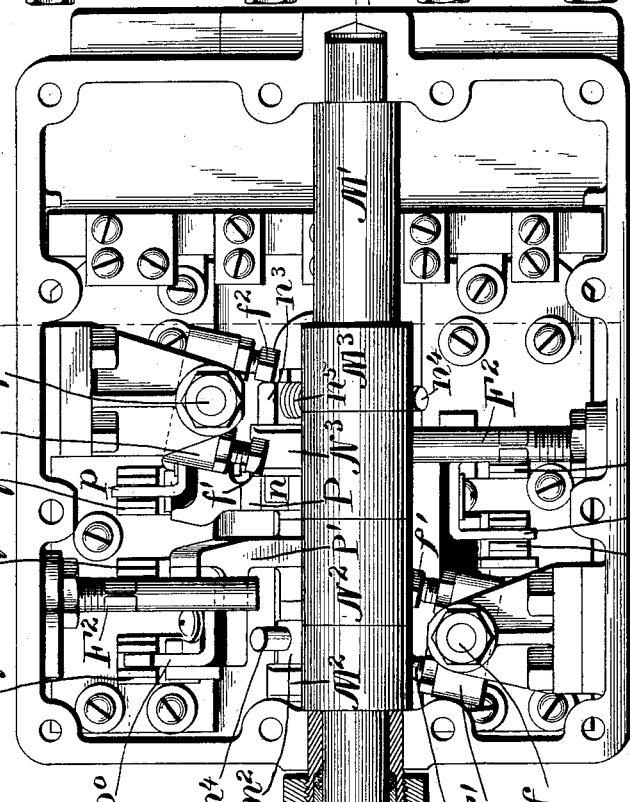

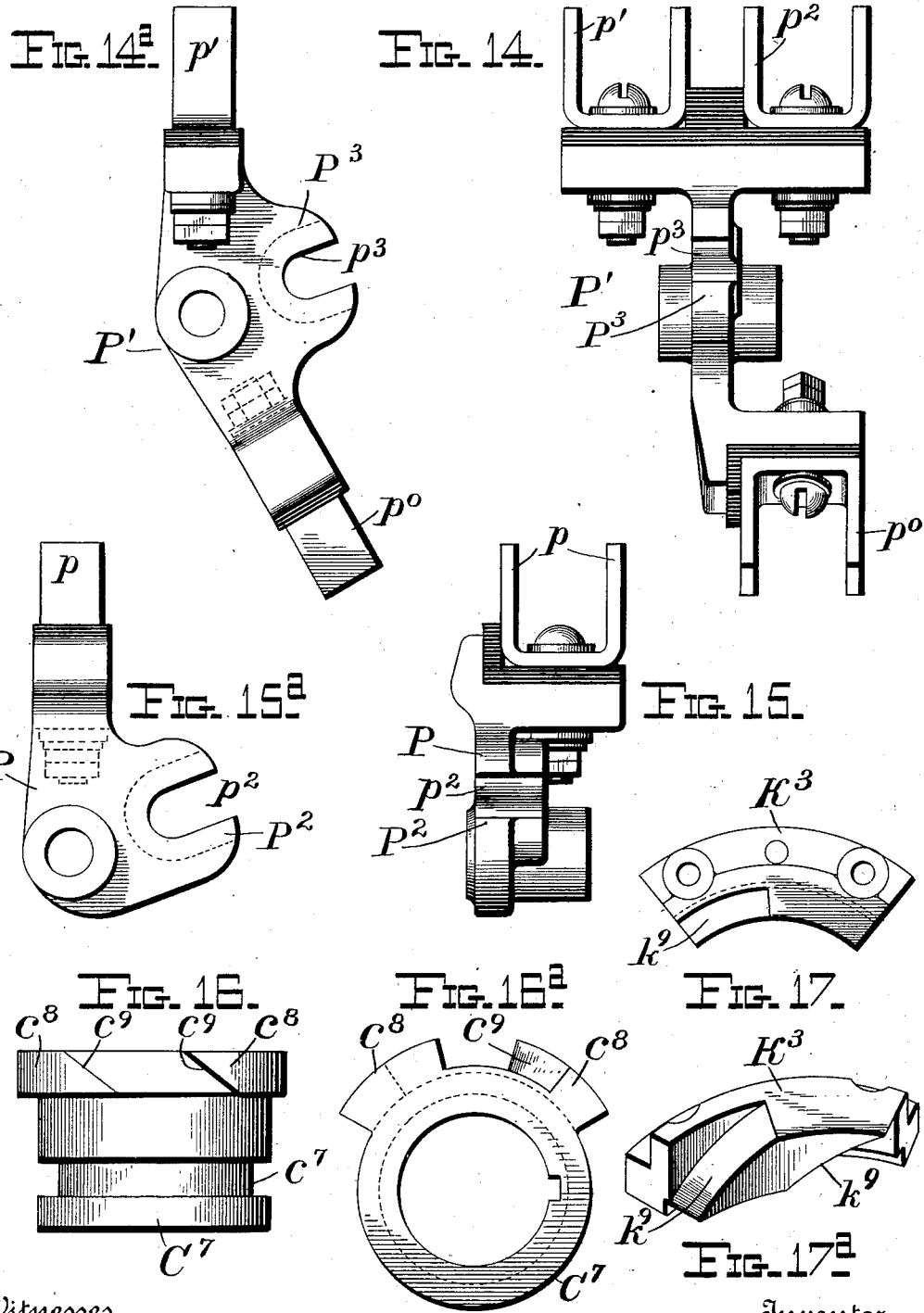

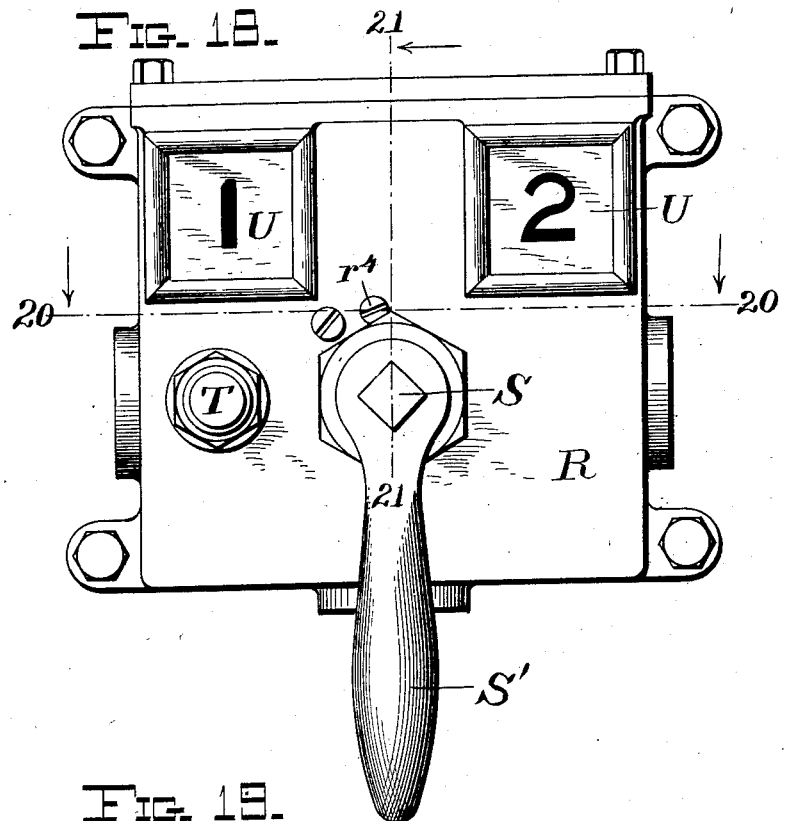
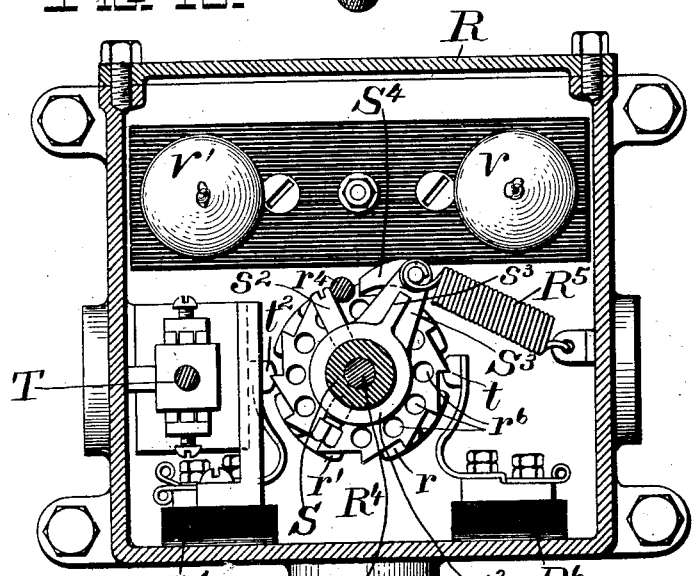

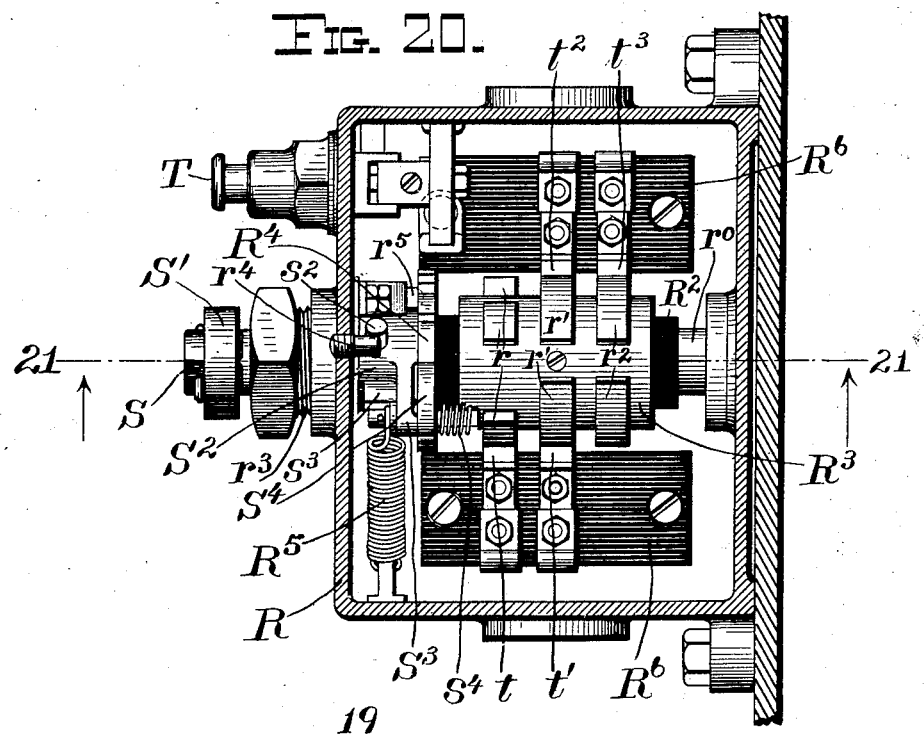

No. 729,280. Patented May 26, 1903.

UNITED STATES PATENT OFFICE.

WILLIAM BARNUM COWLES, OF CLEVELAND, OHIO.

ELECTRICALLY-OPERATED SYSTEM FOR CLOSING WATER-TIGHT DOORS, HATCHES, OR THE LIKE.

SPECIFICATION forming part of Letters Patent No. 729,280, dated May 26, 1903.

Application filed August 1, 1901. Serial No. 70,551. (No model.)

*To all whom it may concern:*

Be it known that I, WILLIAM BARNUM COWLES, a citizen of the United States, residing at Cleveland, in the county of Cuyahoga and State of Ohio, have invented certain new and useful Improvements in Electrically-Operated Systems for Closing Water-Tight Doors, Hatches, or the Like; and I do hereby declare the following to be a full, clear, and exact description of the invention, such as will enable others skilled in the art to which it appertains to make and use the same.

My invention relates to improvements in apparatus for operating bulkhead-doors, hatches, or the like by means of electricity, for operating the said doors either from a distant point or at the door itself, for operating the doors by hand in case it should become necessary or desirable to do so, and for signaling when the door, hatch, or the like is in any predetermined position.

My invention also consists in certain details of apparatus and certain combinations and arrangements of parts, as will hereinafter be more fully described and claimed.

Reference is had to the accompanying drawings, in which the same parts are indicated by the same characters throughout the several views.

Figure 1 is a diagram showing the electric circuits by means of which the doors, hatches, or the like are operated. Fig. 2 represents a development of the surface of the controller-cylinder at each door, hatch, or other object to be moved and shows the arrangement of the metallic contacts on the surface of the non-conducting cylinder. Fig. 3 is a front elevation of a horizontal sliding bulkhead-door with the parts for operating the same constructed according to my invention, the door being shown as closed. Fig. 4 represents a section on the broken line 4 4 of Fig. 3 looking in the direction of the arrows. Fig. 5 is a front elevation of a vertical sliding bulkhead-door constructed according to my invention with parts for operating the same, the door being shown as closed. Fig. 6 represents a horizontal section along the broken line 6 6 of Fig. 5 looking down. Fig. 7 represents a vertical section along the line 7 7 of Fig. 5 looking in the direction of the arrows. Fig. 8 represents a vertical section along the line 8 8 of Fig. 5 looking in the direction of the arrow. Fig. $8^a$ represents a plan showing the gearing connecting the shaft I and the power-gearing. Fig. 9 represents a section through the power-gear for operating the door, the section being along the line 9 9 of Figs. 10 and 11 looking in the direction of the arrows. Fig. 10 represents a section along the broken line 10 10 of Fig. 9 looking in the direction of the arrow. Fig. 11 represents a section along the line 11 11 of Fig. 9 and $11^a$ $11^a$ of Fig. 12 looking in the direction of the arrows. Fig. 12 represents an elevation of the limit-switch mechanism with the top of the case removed. Fig. 13 represents a section through the limit-switch mechanism along the lines 13 13 of Figs. 11 and 12 looking in the direction of the arrows. Fig. 14 is a front elevation of the double contact-lever, and Fig. $14^a$ is a side elevation of the same. Fig. 15 is a front elevation of the single contact-lever, and Fig. $15^a$ is a side elevation of the same. Fig. 16 represents a plan view of the sliding cam-sleeve for operating the limit-switch, and Fig. $16^a$ is an end view of the same. Fig. 17 is a plan view of the cam which engages the sleeve shown in Fig. 16, and Fig. $17^a$ is a perspective view of said cam. Fig. 18 is a front elevation of the emergency-switch, arranged to operate two doors, hatches, or the like. For convenience of description the connection for two doors only are shown; but it will be obvious that the parts may be multiplied indefinitely. Fig. 19 represents a section through the casing for the emergency mechanism along the line 19 19 of Fig. 21 looking in the direction of the arrows. Fig. 20 represents a section through the emergency mechanism along the lines 20 20 of Figs. 18 and 21 looking in the direction of the arrows, and Fig. 21 represents a section through the emergency mechanism along the lines 21 21 of Figs. 18 and 20 looking in the direction of the arrows.

It will be more convenient and tend to clearness to describe the details of the apparatus before referring to the conjoint action of all the parts or to the electric circuits shown in the diagram, Fig. 1.

Referring now to Figs. 3 and 4, A represents the bulkhead; B the sliding door, which travels in a suitable frame A' and with suitable tightening devices. (Not shown.) $A^2$ represents a bracket or bed-plate fast to the bulkhead A, on which the power-gear is mounted. $B'$ is a cylinder fast to the door which forms a sheath for the screw C, which screw engages in the nut $B^2$, fast to the door. The position of the door when closed is indicated by a tappet $b$, which operates a push-button or like device $b'$ and signals when the door is closed. D represents the casing for the power-gear, E represents the casing for the electric motor, and F represents a casing for the limit-switch, all of which are mounted on the bed-plate $A^2$. The electric conductors are properly insulated and are preferably inclosed in conduits G. These conductors are connected to the electric motor, the limit-switch, and the controller H and also to the push-button $b'$, as shown in Fig. 3. The object of inclosing the various parts is to keep out dust, dirt, and water and protect these parts against injury from the cargo of the vessel or from accidents or from the enemy's projectiles. The controller H may be operated from either side of the bulkhead by means of handles $h$ (see Fig. 3) or $h'$, (see Fig. 6,) mounted on a shaft $h^0$.

Referring now to Figs. 5 to $8^a$, these figures show a vertically-sliding bulkhead-door in which the arrangement of parts is generally similar to that already described with reference to Figs. 3 and 4. In these figures the additional features shown are the vertical shaft I, which is rotated by means of suitable gearing in the casing $I'$, operated by a crank on either end of the shaft $i$, which passes through the bulkhead A. At the upper end of the shaft I is a miter gear-wheel $i'$, which meshes with a similar wheel $i^2$ on a short horizontal shaft $E^2$ of the power-gear through the miter gear-wheels $i^3$ and $e^2$, as shown in Fig. $8^a$. The power-gear may be operated either by hand through this shaft I or by the electric motor, as will be hereinafter more fully described. Another feature (shown in Figs. 5 to 7) is a tightening device $A^0$, having rollers $a^4$ engaging the wedge $b^4$ (see Fig. 7) at the bottom of the door to tighten the same and also the inclined face $b^5$ near the top of the door, which engages the roller $a^5$ (see Fig. 7) to tighten the top of the door on its seat. These rollers $a^5$ are mounted between the beam $A^3$ and the door, this beam $A^3$ being secured to the door-frame $A'$. With this door I preferably mount the push-button $b'$ or other signaling device on the beam $A^3$ and have the tappet $b$ carried on the arm $b^2$, which moves with the door.

While I have referred in the foregoing description to sliding doors, it will be obvious that the devices hereinafter described may be applied to the reciprocation of hatches, gates, or heavy bodies of any kind that it is desired to move, and it is my purpose to consider such bodies to be moved as the equivalents of the door in the reciprocating mechanism hereinafter described.

Referring now to the power-gear for sliding the door or other object to be moved, as illustrated in Figs. 9 to 11, the end of the screw C is reduced, as at $C'$ and again as at $C^2$, terminating in the screw-threaded portion $c^2$, to which I secure a cap $C^3$, as by means of the screw $c^3$. This cap has prongs $c^4$ projecting into the annular nut $C^4$, which abuts against the sleeve $C^5$, which is keyed, as at $c^5$, onto the reduced portion $C^2$ of the screw C. In order to give increased bearing-surface for the thrust of the screw C, I provide a set-collar $C^0$, abutting against the shoulders $c^0$ on the screw C, which bears against the ring $D^0$, mounted in a recess in the part $D'$ of the casing D. The bearing between the collar $C^0$ and the ring $D^0$ may be kept clear of grit by means of the packing $D^3$. A similar ring $D^{00}$ is provided to bear against the set-sleeve $C^5$ when the thrust of the screw C is in the opposite direction. This set-sleeve $C^5$ has arms $C^6$, perforated to receive the ring $K'$, around which ring are the stout coil-springs $K^2$. These coil-springs abut at one end against the arms $C^6$ and at the other against the lugs $k'$ on the worm-ring K, which worm-ring is provided with worm-teeth $k$, engaging in a double worm $E'$ on the shaft $E^2$, which shaft is secured to or integral with the armature-shaft of the electric motor contained in the casing E, and the other end of the shaft $E^2$ is geared to the shaft I, so that the worm $E'$ may be turned either by the electric motor E or by hand through the shafts $i$ and I, as already described. The worm-ring K is slipped over the larger cylindrical surface of the set-sleeve $C^5$ and is held against sliding longitudinally on said surface by means of the ring $C^8$, fast to the sleeve $C^5$. A stop $k^{00}$ is secured to the worm-ring K, which engages one or the other of the stops $c^{00}$ (see Fig. 11) on the sleeve $C^5$. The purpose of these various stops is to allow the worm-ring a limited play relative to the sleeve $C^5$ after the door has reached the limit of its travel or after it has encountered a sufficient obstruction to stop its further progress. The purpose of the springs $K^2$ is to relieve the pressure on the worm-ring when the door stops suddenly, and thus to prevent breakage of the parts. In order to provide for the automatic stopping of the electric motor when the motion of the door is arrested for any cause, I provide the limit-switch and the mechanism for operating the same, which will now be described.

The cam $K^3$ (see Figs. 9, 17, and $17^a$) is secured, by means of the pin $k^3$ and screws, to the worm-ring K, and the cam-surfaces $k^9$ engage corresponding surfaces $c^9$ of the lug $c^8$ on the sliding cam-ring $C^7$, (see Figs. 9, 16, and $16^a$,) which is mounted over the smaller cylindrical portion of the sleeve $C^5$ and over the annular nut $C^4$. This sliding sleeve $C^7$ is provided with an annular recess $c^7$, in which engages the shoes $m^2$, pivoted on the arms $m'$, (see Fig. 11,) carried by the yoke M. This yoke is pivoted at its outer end on the pin $m$ and is secured to or integral with the shaft M', which forms its second pivot. This shaft M' carries the short arms $M^2$ and $M^3$ and the long arms $N^2$ and $N^3$ in the limit-switch casing F, which arms operate the limit-switch, as will be hereinafter described. Thus it will be seen that when the further motion of the door is stopped while the electric motor is still running the sleeve $C^5$ will be stopped; but the worm-ring K will continue to turn through a small angle, and in so doing the cam $K^3$ will move the cam-ring $C^7$ longitudinally on the sleeve $C^5$, rocking the shaft M' and operating the limit-switch to cut off the electric current.

The construction of the limit-switch and the details of the electric circuits will now be described.

The limit-switch consists, primarily, of eight contacts $q'$ to $q^8$, as shown in Fig. 1, and two contact-levers P and P', mounted loosely on a rod $p^3$. The contact-lever P has one arm, to the end of which is secured and insulated therefrom a U-shaped contact-piece $p$ in position to electrically connect the two contacts $q^7$ and $q^8$. The contact-lever P' is provided with two arms adapted to make and break contact alternately, one of said arms having a U-shaped contact-piece $p^0$ in position to connect the two contacts $q^5$ and $q^6$ and the other arm having two similar contact-pieces $p'$ and $p^2$, the contact-piece $p'$ being arranged to connect the contacts $q^3$ and $q^4$ and the contact-piece $p^2$ being arranged to connect the contacts $q'$ and $q^2$. The two arms of the lever $p'$ are set at an angle of about one hundred and fifty degrees, so that when the contact-pieces on one arm are in engagement with their respective contacts the contact-pieces on the other arm will be disengaged, and these levers P and P' may be rocked upon the rod $p^3$ to make and break contact as desired. The levers P and P' are provided with lugs $P^2$ and $P^3$, respectively, having slots $p^2$ and $p^3$, in which slots engage wrist-pins $n$, which will be hereinafter described. The shaft M' from the yoke M extends through the limit-switch in front of the levers P P', as shown in Figs 11 to 13, and has mounted thereon two short arms $M^2$ and $M^3$ and two longer arms $N^2$ and $N^3$, the short arms being rigidly secured to the shaft and the longer arms mounted loosely thereon. Heads $n^2$ and $n^3$ are pivoted to the ends of the arms $N^2$ and $N^3$, the said heads being provided with wrist-pins $n$, which extend through the ends of the said arms $N^2$ and $N^3$ and into the slots $p^2$ and $p^3$ of the contact-levers P and P'. The heads $n^2$ and $n^3$ are provided with rods $n^4$, which extend through openings in similar heads $m^2$ $m^3$, pivoted to the ends of the short arms $M^2$ and $M^3$, and springs $n^5$ are mounted on the rods $n^4$ between the heads $n^2$ and $m^2$ and between the heads $n^3$ and $m^3$, which springs tend to press apart the members of each pair of heads. Stops F' are pivoted at points $f$ in the limit-switch casing and are provided at each end with stop-screws $f'$ and $f^2$. One of these stops F' is provided for each pair of arms $N^2$ $M^2$ and $N^3$ $M^3$, and the said stops are so placed that the arm $N^2$ or $N^3$ will strike one of the stop-screws $f'$, while the arm $M^2$ or $M^3$ will strike one of the other stop-screws $f^2$. Stationary stops $F^2$ are also provided in the casing to limit the movement of the arms $N^2$ $N^3$ in the opposite direction. As shown in Fig. 13, the single contact-lever P is in engagement with the contacts $q^7$ and $q^8$ and the double contact-lever P' is in engagement with the contacts $q'$ to $q^4$, the springs $n^5$ tending to keep the levers in these positions. At this time the levers $N^2$ and $N^3$ will lightly touch the stop-screws $f'$, but are held from movement by the levers P and P', which have reached the limit of their movement in one direction. When the shaft M' is rocked in the direction of the arrow in Fig. 13, the arm $M^3$ will move upward, carrying the head $m^3$ across the dotted line $z$ and finally striking the stop-screw $f^2$ on the pivoted stop F', causing the said stop to move about its pivotal point $f$ and start the arm $N^3$ in the opposite direction. This movement will cause the spring $n^5$ to exert its pressure in the opposite direction and bring the single contact-lever P out of engagement with the contacts $q^7$ and $q^8$, the movement of the said arm and lever being stopped when the arm $N^3$ strikes the stationary stop $F^2$. When the aforesaid movement takes place, the arm $M^2$ will move in the same direction as the arm $M^3$; but this movement will produce no other result than to allow the spring $n^5$ between the arms $N^2$ and $M^2$ to expand a little more. When the shaft M' is rocked back again, the movements of the arms and levers will be reversed, so that the lever P will be again thrown into engagement with contacts $q^7$ and $q^8$. When the shaft M' is rocked from the position shown in Fig. 13 in the direction opposite to the arrow, the movements just described with relation to the arms $M^3$ and $N^3$ will be performed by the arms $M^2$ and $N^2$, but of course in the opposite direction, the double contact-lever P' being moved to break contact with the contacts $q'$ to $q^4$ and to make contact with the contacts $q^5$ and $q^6$.

The emergency-switch (shown in Figs. 18 to 21) consists of a casing R, in which is mounted a shaft R', having a sleeve $R^2$, of insulating material, upon which is mounted a metal drum $R^3$, having a series of short projections $r$ and two series of longer projections $r'$ and $r^2$. The shaft R' is mounted at the rear end in a bearing $r^0$ in the back part of the casing R and at the front end in a bearing $S^0$ (shown in dotted lines) in a shaft S, which is journaled in a packing-box $r^3$ in the front of the casing. The shaft S is provided with a handle S', by which it may be turned. A ratchet-wheel $R^4$ is secured to the shaft R', and a sleeve $S^2$, having an arm $S^3$, is secured upon the shaft S. A pawl $S^4$ is pivoted on the arm $S^3$ and is held in engagement with the ratchet-wheel $R^4$ by a spring $s^4$. A stud $s^2$ is secured to the sleeve $S^2$ and is arranged to strike a stop $r^4$ to limit the movement of the shaft S in one direction, and a flange $s^3$ on the arm $S^3$ will strike said stop $r^4$ and limit the movement of said shaft S in the other direction. A spring $R^5$ is connected with the arm $S^3$ and tends to keep the said arm, sleeve, and shaft S in their normal positions, as shown in Fig. 19, at which time the stud $s^2$ is resting against the stop $r^4$ and the pawl $S^4$ is in engagement with one of the teeth on the ratchet-wheel $R^4$. Secured to insulating-pieces $R^6$ are a series of contact-pieces $t$, $t'$, $t^2$, and $t^3$, the contact-pieces $t$ and $t'$ being arranged on one side of the drum $R^3$ to make contact with the two series of projections $r$ and $r'$, respectively, and the contact-pieces $t^2$ and $t^3$ being arranged on the other side of the drum $R^3$ to make contact with the two series of projections $r'$ and $r^2$. When the parts are in their normal position, the contact-pieces $t$ to $t^3$ are opposite to the spaces between the contact-strips on the drum $R^3$, as shown in Fig. 19, and no contact is made.

When the emergency-switch is operated the handle $S'$ is turned until the flange $s^3$ strikes the stop $r^4$, which movement will turn the drum and cause the longer projections to make contact with their respective contact-points. As soon as the handle is released the spring $R^5$ will return the parts to their normal position, the drum $R^3$ being held from returning by a spring-detent $r^5$, (shown in dotted lines in Fig. 21,) which engages in a series of holes $r^6$ in the ratchet-wheel $R^4$. The next movement of the handle will turn the drum still further and bring one of the short projections of the series $r$ in contact with the contact-piece $t$, the other contact-pieces still remaining in contact with their respective strip. The next turn of the drum would bring the spaces between the projections opposite the contact-pieces, and thus break all the circuits, leaving the parts in position for a repetition of the same movements.

The form of emergency-switch just described is adapted for the operation of two doors only. For each additional door placed in the system another series of projections on the drum and another contact-piece would be required. The projections in the series $r'$ and $r^2$, which make contact with three of the contact-pieces on the first movement of the handle $S'$, and so close the circuit to the first door, must be long enough to remain against their contact-pieces until one of the shorter projections in each of the series on the drum has been brought against its respective contact-piece, and thus closed the circuit to that particular door, the arrangement being such that the first movement of the drum will close the circuit to the first door, the second movement will close the circuit to the second door, and so on, each movement of the drum starting another door, all the circuits remaining closed until the last door has been closed, after which the next movement of the drum will break all the circuits.

V V' designate incandescent lamps, one of which is connected with each of the doors and arranged so that the circuit therethrough will be closed when the door is closed, thus lighting the lamp and indicating to the operator at the emergency-station when each door is closed. A glass U, numbered to correspond with the number of the door, is placed in the front of the casing R in front of each of the lamps V V', through which the light may be seen. A push-button T is arranged in the front of the casing R and so connected that when the said push-button is closed if one of the doors should be closed the lamp connected with that particular door will glow, thus indicating if the door is open or closed without turning the emergency-switch.

The arrangements of the circuits are as follows, referring particularly to Figs. 1 and 2: The controller-cylinder $H^2$ is mounted on a shaft $h^2$ and provided with contact-strips $h^3$. A series of contact-fingers 1, 2, 3, 4, 5, 6, 7, 8, 9, 10, and 11 are arranged to make contact with the several contact-strips $h^3$, the contact-fingers 2 and 9 being arranged normally out of contact with their respective strips. A solenoid Y is connected with the contact-finger 9, so that when the solenoid is energized it will bring the said contact-finger up against its respective contact-strip. A contact-point $2^\times$ is arranged just back of the contact-point 2, but normally out of contact therewith, and a solenoid Y' is connected with the said contact-point $2^\times$, so that when the said solenoid is energized it will first move the contact-point $2^\times$ against the contact-point 2 and then move both into contact with their respective contact-strips $h^3$. The motor $E^0$, which moves the door, is of the compound type, $e$ designating the armature, $e'$ the series field-coils, and $e^2$ the shunt field-coils, which are all connected together through the controller-cylinder $H^2$, as will be readily understood. The limit-switch is shown in the position it assumes when the door is open, the contacts $q'$ and $q^2$ being connected by the piece $p^2$ and the contacts $q^3$ and $q^4$ being connected by the piece $p'$ and the contacts $q^5$ to $q^8$ being open. The contacts $q'$ and $q^8$ are connected together by a wire $j$ and with the main $x$ from the dynamo X by a wire $x^2$, and the contacts $q^4$ and $q^6$ are connected together by a wire $j'$ and with the other main $x'$ by a wire $x^3$.

The connections from the contact-points of the controller to the limit-switch and thence to the emergency-station are as follows: The points 1 and 2 are connected together by the wire $2'$ and by a wire $1'$ with the contact $q^7$. The point $2^\times$ is connected by a wire $2^{\times\prime}$ with the contact $q^8$. The point 9 is connected with the point 10 by a wire $9'$. The point 10 is connected by a wire $10'$ with the contact $q^3$, and the point 11 is connected by a wire $11'$ with the contact $q^5$. The solenoid Y is connected by the wire $y$ with the point 11 and by a wire $y'$ with the other solenoid Y', the latter being connected by a wire $y^2$ with the contact $q^2$.

The emergency-station is connected with the limit-switch as follows: The contact-finger $t^2$ is connected by a wire $t^4$ with the main $x'$ and by a wire $t^5$ with one of the contact-points in the push-button T. The contact-finger $t^3$ is connected by a wire $t^6$ with the wire $v$, which connects the lights V and V' together, and this wire $t^6$ is also connected with the other contact-point of the push-button T. The light V is connected by a wire $v'$ on one of the contact-points in the contact-box $b'$ at the door, and the other contact-point in said box is connected by a wire $v^2$ with the contact $q^8$ in the limit-switch. The contact-finger $t'$ is connected by a wire $t^7$ with the contact $q^5$ in the limit-switch. The light V' is connected by a wire $v^3$ with the contact-box of another door, and the contact-finger $t$ is connected by a wire $t^8$ with the proper contact of the limit-switch of the same door.

The operation of the device is as follows: Fig. 1 shows the parts in their normal position when the door is open. The controller-cylinder is then in its middle position, the contact-points 1 to 11 being opposite the line $o$ $o$ on the said cylinder. In this position the circuits are broken at the points 1, 2, 9, 10, and 11, and no current can flow to the motor. Should the emergency-switch be turned to bring the points $t'$, $t^2$, and $t^3$ in contact with projections on the drum R³, the current would flow from the main $x$ through the wire $x^2$, contact $q'$, contact-piece $p^2$, contact $q^2$, wire $y^2$, through the solenoid Y', energizing the latter and causing the point 2× to make contact with the point 2, pushing the latter against the contact-strips $h^3$ on the controller-cylinder. The current will then pass through the wire $y^2$ to the solenoid Y, energizing the same and causing the point 9 to make contact with one of the strips $h^3$. The current will then pass through the wire $y$, wire 11', wire $t^7$, contact-finger $t'$, drum R³, contact-finger $t^2$, wire $t^4$, to return-main $x'$. When the circuit is closed at the points 2×, 2, and 9, the current will flow from the main $x$ through wire $x^2$, wire $j$, wire 2×', points 2× and 2, through the strips $h^3$ to and from the motor E⁰ to the point 9, through wire 9', wire 10', contact $q^3$, piece $p'$, contact $q^4$, returning to the main $x'$ through the wire $x^3$, thus running the motor to close the door. As the door starts downward the first movement of the power-gear will actuate the limit-switch and cause the single contact-lever P to move its contact-piece $p$ into engagement with the contacts $q^7$ and $q^8$. The conductor V², leading from limit-switch to contact-box, is always connected to the main through the wire $j$, independent of the action of the limit-switch, the limit-switch remaining in this position while the door is closing. When the door is closed, the limit-switch will be actuated by the power-gear, as hereinbefore described, and will break the circuit at the contacts $q'$ to $q^4$, stopping the flow of current to the motor and solenoids. The final movement of the door in closing will push the contact-piece $b$ on the door into the contact-box $b'$, thus closing the light-circuit and causing the light $v$ to glow, indicating to the operator at the emergency-station that the door has closed. While the door is closing, should it be necessary to reverse its movement, the controller-cylinder H² may be turned ninety degrees, which will bring the parts along the line O³ O³, and the door will open, the circuits and action of limit-switch being the same as hereinafter described. When the controller-cylinder is returned to its middle position, the downward movement of the door will continue as before. Should it be desired to close the door by the controller H, the parts being in the position shown in Fig. 1, the cylinder H² is turned by the handle $h$ through an arc of ninety degrees in the direction to bring the parts along the line O² O² against the contact-points 1 to 11. This will close the circuits at the points 1, 10, and 11 and allow the current to flow from the main $x$, through the wire $x^2$, contact $q'$, contact-piece $p^2$, contact $q^2$, wire $y^2$, through the solenoid Y', energizing the latter and causing the point 2× to make contact with point 2. The current will then pass through wire $y'$, solenoid Y, wire $y$ to point 11, through controller-strips to point 10, through wire 10', contact $q^3$, piece $p'$, and contact $q^4$, returning to the main $x'$ through wire $x^3$. When the contact-point 2× makes contact with the point 2, the current will flow from the main $x$, through wire $x^2$, wire $j$, points 2× and 2, wire 2', to point 1, from point 1, through the controller-strips to and from the motor E⁰, to the point 10, through wire 10', contact $q^3$, piece $p'$, and contact $q^4$, returning to the main $x'$ through wire $x^3$, thus running the motor to close the door. The first movement of the door will actuate the limit-switch as before, and the current will flow from the main $x$ over $x^2$, $j$, $q^8$, $p$, $q^7$, 1' to point 1, through the controller projections to and from the motor E⁰ to the point 10, through wire 10', contact $q^3$, $p'$, $q^4$, returning to the main $x'$ through wire $x^3$, thus running the motor to close the door.

The further operation of the device is the same as when the door is closed by the emergency-switch just described, except that the light will not glow unless the push-button T be pressed. The closing of the door causes the limit-switch to change its connections, leaving the contacts $q'$ to $q^4$ open and the contacts $q^5$ and $q^6$ connected together by the connecting-piece $p^0$ and the contacts $q^7$ and $q^8$ connected by the piece $p$. The door may now be opened by turning the controller-cylinder ninety degrees in the opposite direction from its middle position. This will bring the parts along the line O³ O³ in line with the points 1 to 11 and close the circuits at the points 1, 10, and 11, allowing the current to flow from the main $x$, through the wire $x^2$, wire $j$, contact $q^8$, piece $p$, contact $q^7$, wire $1'$, point 1, from point 1 through the strips on the controller-cylinder to and from the motor, passing through the armature in the reverse direction, then to the point 11, through the wire $11'$, contact $q^5$, piece $p^0$ to contact $q^6$, wire $j'$, and wire $x^3$ to the wire $x'$, thus running the motor to open the door. When the door starts to open, the limit-switch will again be actuated and take the same position it had when the door was closing—that is, with the contacts $q'$ and $q^2$ connected together, the contacts $q^3$ and $q^4$ connected together, the contacts $q^5$ and $q^6$ open, and the contacts $q^7$ and $q^8$ connected together. The circuits will be the same as when the door was closing, except that the controller-cylinder being turned in the opposite direction the current through the armature will be reversed. When the door reaches the limit of its open position, the power-gear will actuate the limit-switch, causing it to assume the position shown in Fig. 1. When the controller is brought into the position along the line $O'$ $O'$, the contact-fingers 3, 4, and 7 will touch the insulation $h^4$, and every single line can be tested without disconnecting any wire whatever. The controller-cylinder is returned to its middle position by a suitable spring. (Not shown.)

In practice it will be more convenient to include the various conductors in a less number of pipes; but a pipe for each circuit is shown to avoid obscurity in the drawings.

It will be obvious that various modifications may be made in the herein-described apparatus which could be used without departing from the spirit of my invention.

Having thus described my invention, what I claim, and desire to secure by Letters Patent of the United States, is—

1. In a system of the character described, the combination with a door, a nut carried by said door, a screw held against longitudinal motion and engaging said nut, a cylinder on said door screening said screw, and means independently operated either by electricity or by hand for rotating said screw and thus moving said door, substantially as described.

2. In a system of the character described, the combination with a door, and power-gearing for operating the same, of an electric motor for operating said power-gearing, and a controller for starting, stopping and reversing the motor, comprising a rotary drum with contact projections thereon, and electromagnetic circuit-closers coacting with said projections to complete the circuits, substantially as described.

3. In a system of the character described, the combination with a door, and power-gearing for operating the same, of an electric motor for operating said power-gearing, and a controller for starting, stopping and reversing the motor, comprising a rotary drum with contact projections thereon, electromagnetic circuit-closers coacting with said projections to complete the circuits, and an emergency-switch operated from a distant point and controlling said circuit-closers, substantially as described.

4. In a system of the character described, the combination with a door, and power-gearing for operating the same, of an electric motor for operating said power-gearing, and a controller for starting, stopping and reversing the motor, comprising a rotary drum with contact projections thereon, electromagnetic circuit-closers coacting with said projections to complete the circuits, an emergency-switch operated from a distant point and controlling said circuit-closers, and a shaft and gearing operated independently by hand for operating said power-gearing when desired, substantially as and for the purposes described.

5. In a system of the character described, the combination with a door, and power-gearing for operating the same, of an electric motor for operating said power-gearing, a controller for starting, stopping and reversing the motor, comprising a rotary drum with contact projections thereon, and electromagnetic circuit-closers coacting with said projections to complete the circuits, and a limit-switch automatically operated when said door reaches the limit of its travel, substantially as described.

6. In a system of the character described, the combination with a door, and power-gearing for operating the same, of an electric motor for operating said power-gearing, a controller for starting, stopping and reversing the motor, comprising a rotary drum with contact projections thereon, electromagnetic circuit-closers coacting with said projections to complete the circuits, an emergency-switch operated from a distant point and controlling said circuit-closers, and a limit-switch automatically operated when said door reaches the limit of its travel, substantially as described.

7. In a system of the character described, the combination with a door, and power-gearing for operating the same, of an electric motor for operating said power-gearing, a controller for starting, stopping and reversing the motor, comprising a rotary drum with contact projections thereon, electromagnetic circuit-closers coacting with said projections to complete the circuits, an emergency-switch operated from a distant point and controlling said circuit-closers, a limit-switch automatically operated when said door reaches the limit of its travel, and a shaft and gearing operated independently by hand for operating said power-gearing when desired, substantially as and for the purposes described.

8. In a system of the character described, the combination with a door, and power-gearing for operating the same, of an electric motor for operating said power-gearing, means at the door for starting and stopping and for reversing said motor, and a mechanical cut-out automatically cutting off the current from said motor when the load becomes excessive, substantially as described.

9. In a system of the character described, the combination with a door, and power-gearing for operating the same, of an electric motor for operating said power-gearing, means at the door for starting and stopping and for reversing said motor, means operated from a distant point for closing said door, and a mechanical cut-out automatically cutting off the current from said motor when the load becomes excessive, substantially as described.

10. In a system of the character described, the combination with a door, and power-gearing for operating the same, of an electric motor for operating said power-gearing, means at the door for starting and stopping and for reversing said motor, independent mechanism operated by hand for operating said power-gearing when desired, and a mechanical cut-out automatically cutting off the current from said motor when the load becomes excessive, substantially as described.

11. In a system of the character described, the combination with a door, and power-gearing for operating the same, of an electric motor for operating said power-gearing, means at the door for starting and stopping and for reversing said motor, means operated from a distant point for closing said door, independent mechanism operated by hand for operating said power-gearing when desired, and a mechanical cut-out automatically cutting off the current from said motor when the load becomes excessive, substantially as described.

12. In a system of the character described, the combination with a door, a nut carried by said door, a screw held against longitudinal motion and engaging said nut, a worm-wheel loosely mounted on said screw, spring connection between said worm-wheel and said screw whereby said worm-wheel is allowed a limited play on said screw, an electric motor driving a worm engaging said worm-wheel, and mechanism automatically operated by the movement of said worm-wheel on said shaft, whereby the current is cut off from said motor when the load exceeds a predetermined limit, substantially as described.

13. In a system of the character described, the combination with a door, a nut carried by said door, a screw held against longitudinal motion and engaging said nut, a worm-wheel loosely mounted on said screw, spring connection between said worm-wheel and said screw whereby said worm-wheel is allowed a limited play on said screw, an electric motor driving a worm engaging said worm-wheel, a cut-out switch, and mechanism automatically operated by the movement of said worm-wheel on said shaft operating said switch when the load becomes excessive, whereby the current is cut off from said motor when the load exceeds a predetermined limit, substantially as described.

In testimony whereof I affix my signature in presence of two witnesses.

WILLIAM BARNUM COWLES.

Witnesses:
   CHAS. J. METZ,
   FRED F. WILKISON.